Figure 1:
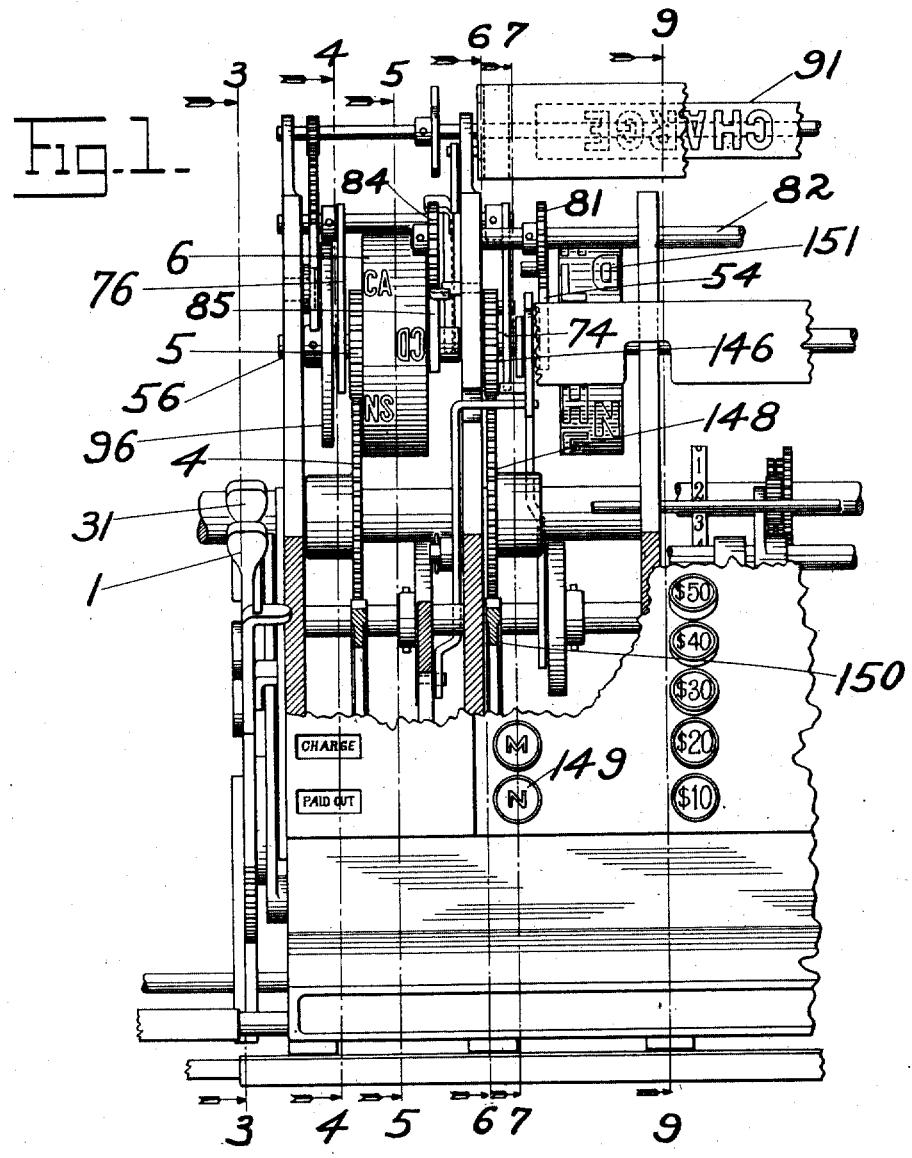

E. J. VON PEIN.
MULTIPLE CASH REGISTER.
APPLICATION FILED MAR. 3, 1910.

1,008,397.

Patented Nov. 14, 1911.
10 SHEETS—SHEET 1.

E. J. VON PEIN.
MULTIPLE CASH REGISTER.
APPLICATION FILED MAR. 3, 1910.

1,008,397.

Patented Nov. 14, 1911.

10 SHEETS—SHEET 3.

E. J. VON PEIN.
MULTIPLE CASH REGISTER.
APPLICATION FILED MAR. 3, 1910.
1,008,397.
Patented Nov. 14, 1911.
10 SHEETS—SHEET 4.
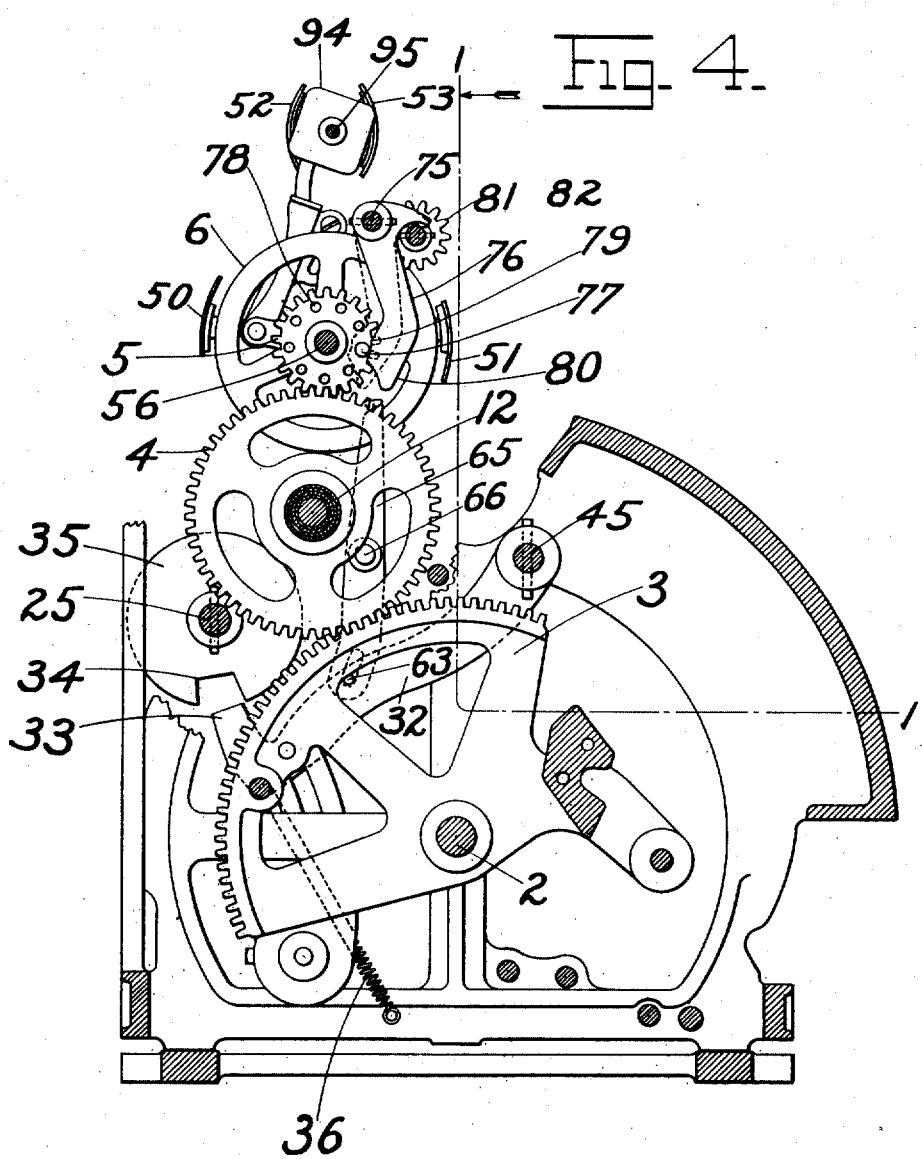
Witnesses
G. W. Fairchild.
Geo. S. Foerderer.
Inventor
Edward J. Von Pein
by
and
Attorneys

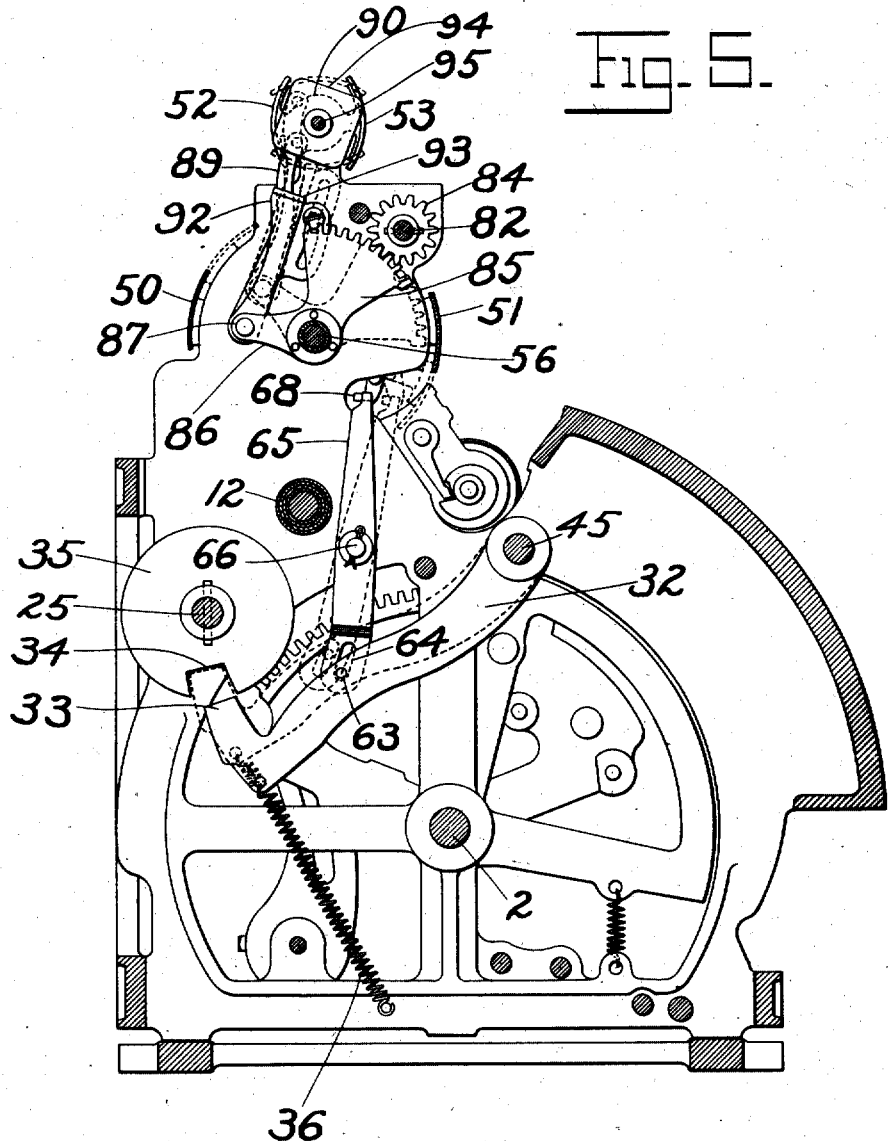

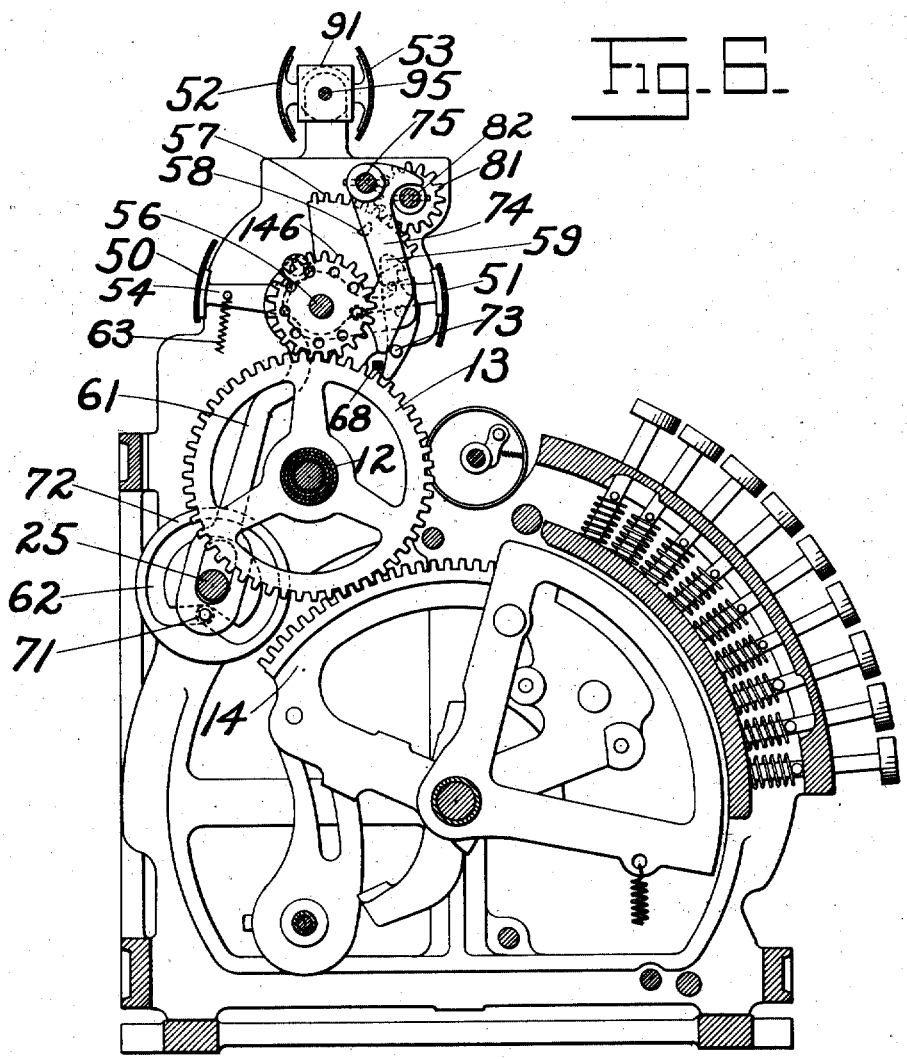

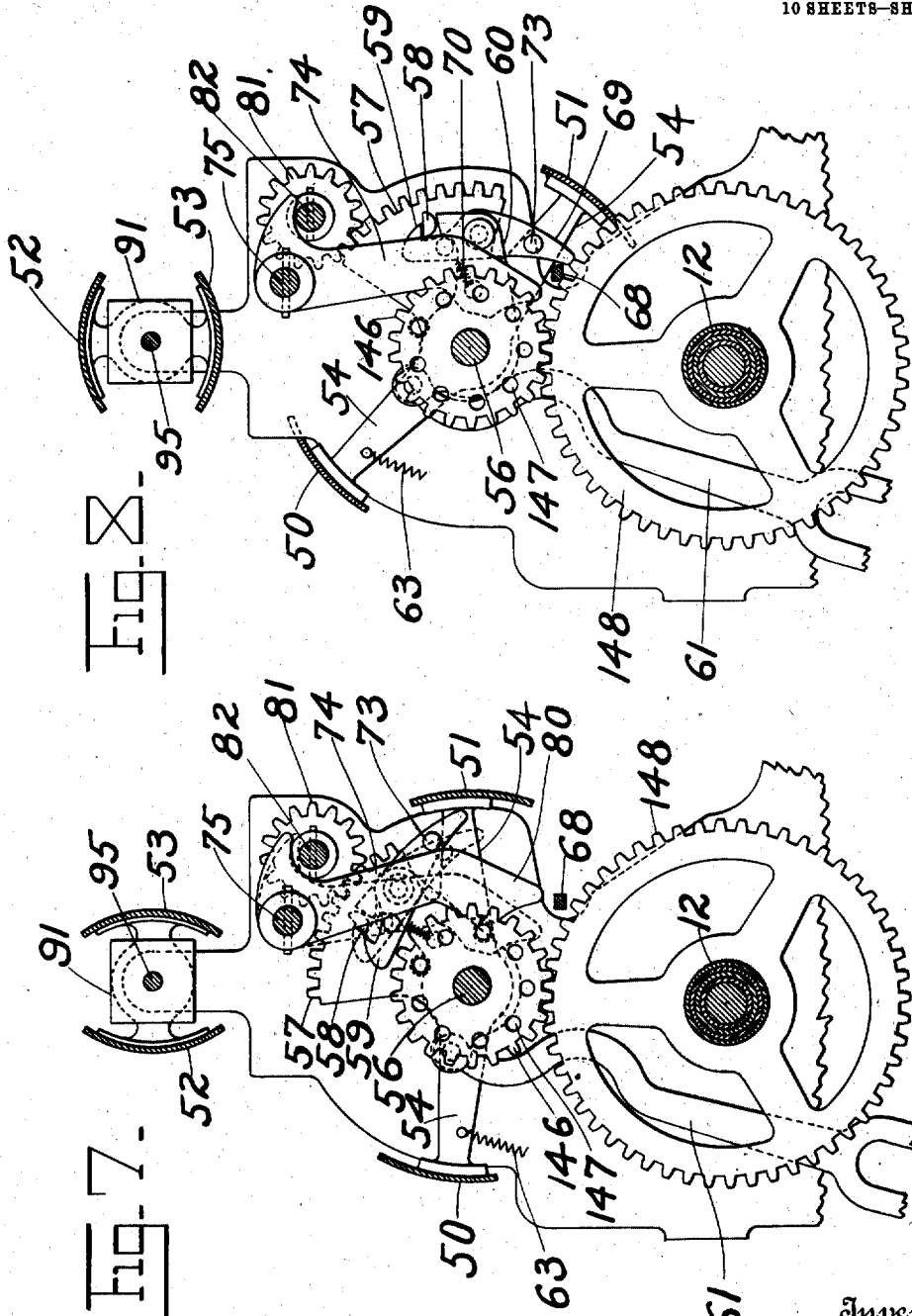

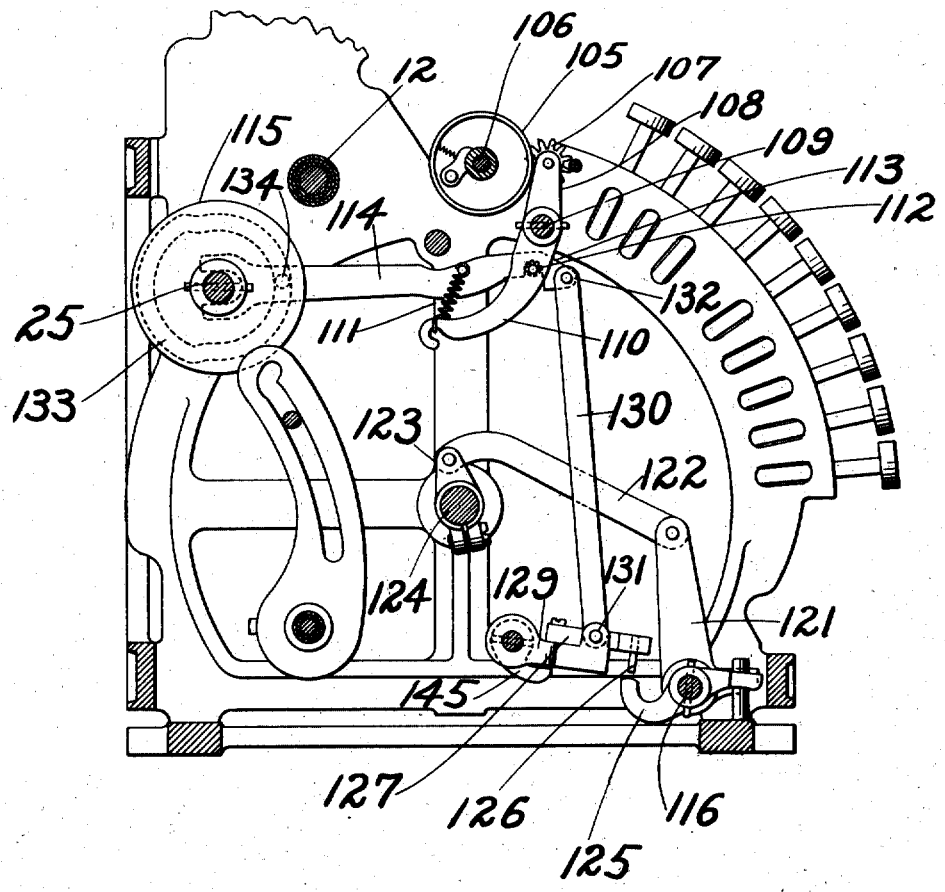

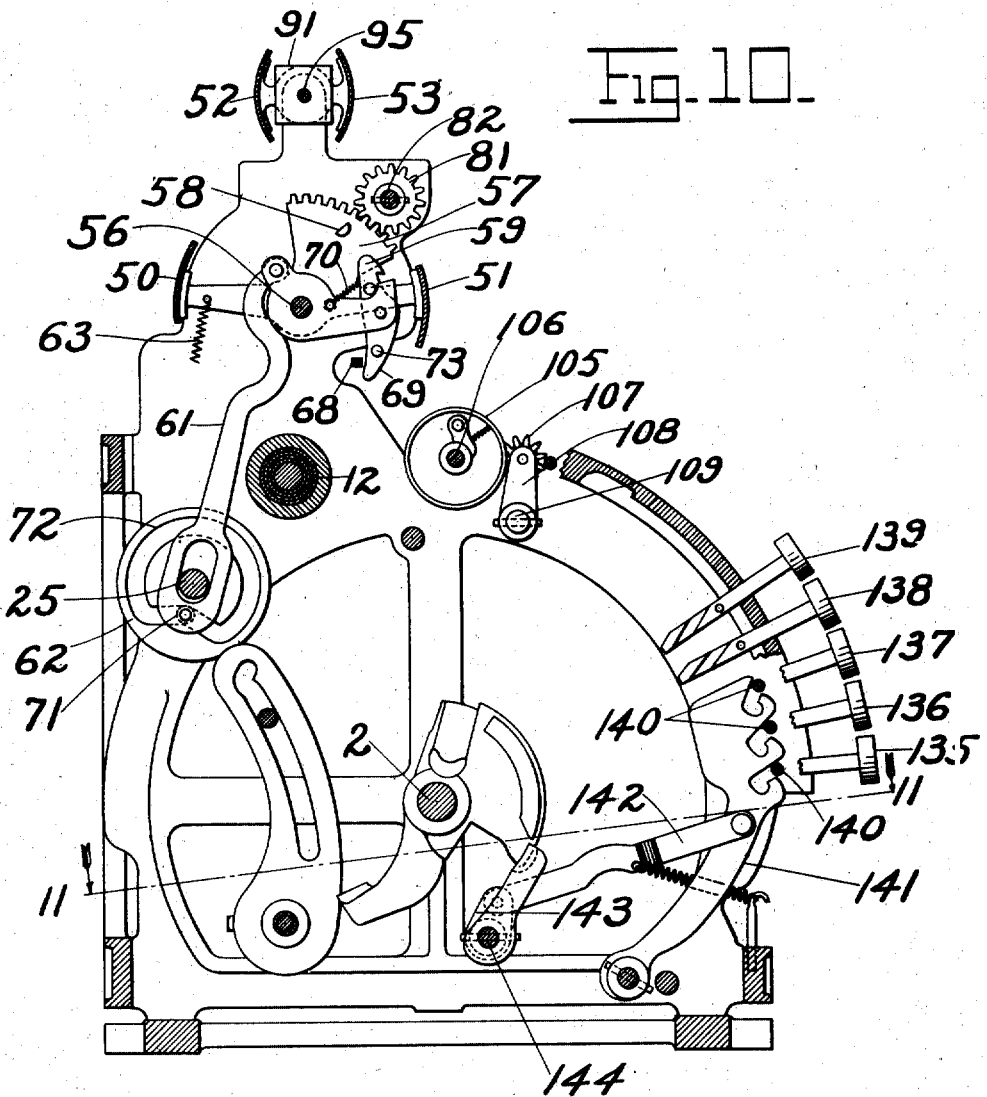

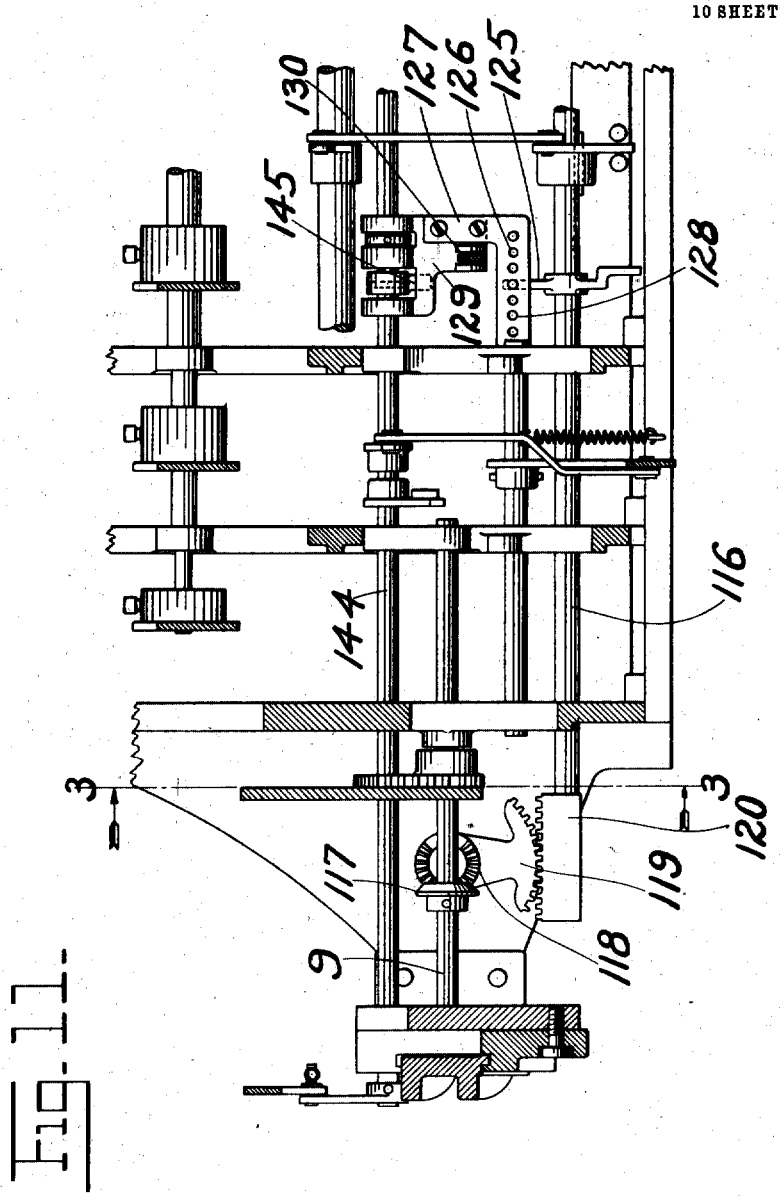

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

MULTIPLE CASH-REGISTER.

1,008,397.  Specification of Letters Patent.  Patented Nov. 14, 1911.

Application filed March 3, 1910. Serial No. 546,981.

*To all whom it may concern:*

Be it known that I, EDWARD J. VON PEIN, a citizen of the United States, residing at Dayton, in the county of Montgomery and State of Ohio, have invented certain new and useful Improvements in Multiple Cash-Registers, of which I declare the following to be a full, clear, and exact description.

This invention relates to cost and selling price cash registers; that is, cash registers which are provided with means for recording in separate totalizers the cost and selling price of articles.

The improvements of the present invention are shown in the drawings applied to the type of cash register described in the patent to Carroll, #703,639, granted July 1, 1902, certain improvements which are shown in pending applications of Edward Von Pein, Serial Nos. 342,887 and 415,959, filed on November 10, 1906 and February 14, 1908 respectively. Only such parts of the register as relate directly to the present invention are shown in the annexed drawings. The class of register referred to is provided with a rotatable reel which carries a plurality of totalizers, with means for rotating this reel to bring any desired totalizer into operative relation with the actuating mechanism. In the present invention one of these totalizers is used for receiving the cost records. The totalizer reel is rotated by means of a lever and when this lever is in the position at which the cost totalizer is in operative relation with the actuating mechanism the indicator flashes will cover the indicators during and after the operation of the machine, under the control of the totalizer setting lever.

The object of causing the indicators to remain hidden during cost registrations is to prevent the indication to customers of cost prices.

A further object is to improve the indication on this type of machine. Roller indicators bearing abbreviations of transactions have been provided heretofore, but the present invention adds to this a second roller indicator bearing full word indicia as more fully described herein.

With these and incidental objects in view the invention consists in certain novel features of construction and combinations of parts the essential elements of which are set forth in appended claims and the preferred form of embodiment of which is hereinafter described with reference to the drawings which accompany and form part of the specification.

Figure 2:
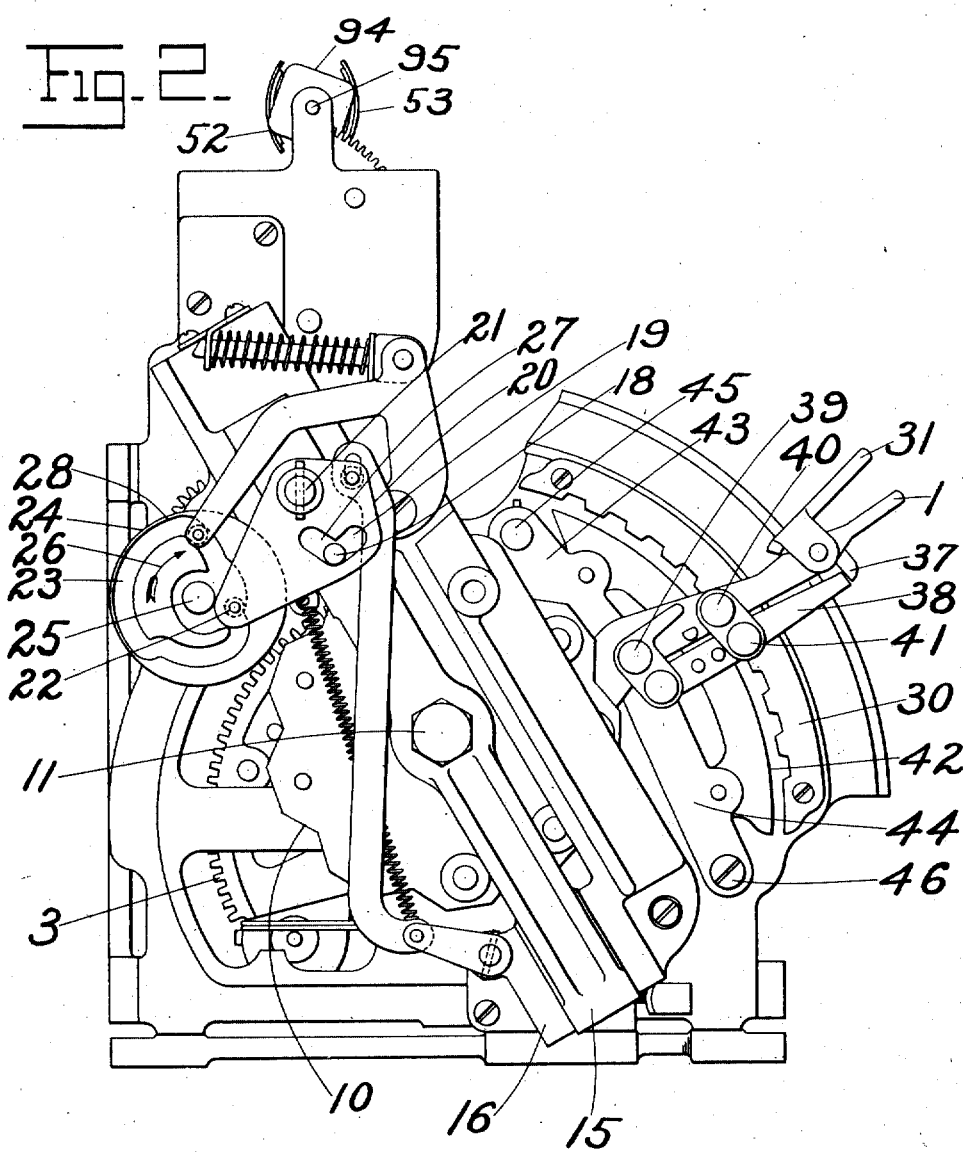
Figure 3:
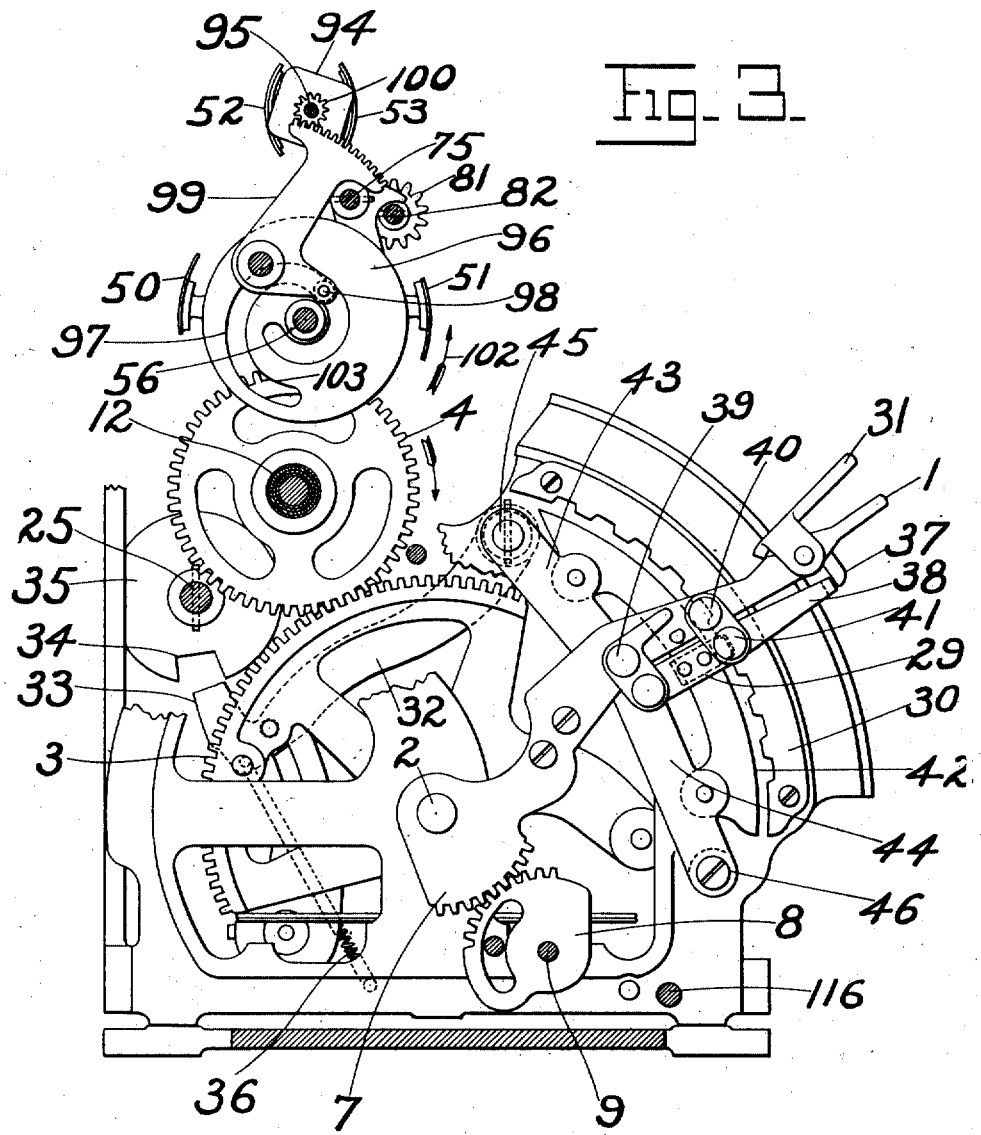

Of said drawings: Figure 1 is a fragmentary front elevation of a cash register constructed according to the invention. Fig. 2 is a left side elevation of the same. Fig. 3 is a left side elevation with the multiple totalizer reel omitted. Fig. 4 is a transverse vertical section of the register taken on the line 4—4 of Fig. 1. Fig. 5 is a transverse vertical section taken on the line 5—5 of Fig. 1. Fig. 6 is a transverse vertical section taken on the line 6—6 of Fig. 1. Figs. 7 and 8 are details in side elevation and partly in section of the flash operating mechanism. Fig. 9 is a transverse vertical section taken on the line 9—9 of Fig. 1. Fig. 10 is a transverse vertical section of a register and illustrates a modification of the invention. Fig. 11 is a horizontal section taken on the line 11—11 of Fig. 10 and illustrates both the main invention and the modification.

In the drawings the lever by means of which the totalizer reel is rotated is indicated by numeral 1. The lever is pivoted on a shaft 2 and is rigidly connected with a segment gear 3. The segment gear 3 meshes with an intermediate gear 4 which in turn meshes with a pinion 5 fast on an indicator drum 6; therefore the movement of the lever 1 is communicated to the indicator which is provided with two sets of indicia for indicating different positions of the lever 1. One of these sets of indicia is readable at the rear of the machine and the other is readable at the front of the machine, the machine cabinet being provided with suitable sight openings for the purpose.

The lever 1 is integral with a segment gear 7 meshing with a segment gear 8 which is fixed to a shaft 9. This shaft also carries a segment gear which meshes with a pinion concentric and rigid with the totalizer reel 10 which is pivoted to the frame of the machine at 11. The specific construction of the totalizer reel is not illustrated in the drawings as it may be found in the patent and applications above referred to. The rotation of the reel upon the setting of the lever 1 causes some particular totalizer, depending upon the extent of movement of the lever 1, to be brought opposite to segment gears which are carried by sleeves 12, Figs. 3 and 4. These segment gears are not shown in the drawings but the sleeves 12 are rigidly connected to intermediate gears 13 (Fig. 6) which receive differential rotation from segment gears 14 controlled by the value keys of the register.

The reel 10 is mounted on a slide 15 (Fig. 2) which is set in the ways 16, and is provided with a pin 18 extending through an L shaped slot 19 in an arm 20 which is pivoted on a pin 21 and is provided with a roller 22 extending into the race 23 of a cam 24 which is carried by a drive shaft 25. The drive shaft 25 is caused to make one rotation upon each operation of the machine in the direction indicated by the arrow 26, and as the roller 22 normally extends into the race 23 of the cam the arm 20 will be oscillated upon each operation of the machine. The arm is first moved downward engaging the pin 18 at the part 27 of the slot 19 thereby camming the slide 15 upwardly and bringing the particular totalizer which is opposite the actuating segment gears into mesh therewith. The totalizer is held in mesh during the time the roller 22 is in the circular part 28 of the cam race, at which time the totalizer is actuated. After the totalizer is actuated the arm 20 is returned to its normal position thus causing the totalizer to be unmeshed from the actuating segments.

The lever 1 is alined in any of its set positions by a spring pressed plunger 29 which co-acts for this purpose with an alining plate 30. A thumb grip 31 on the lever 1 is pressed toward the lever 1 in order to move the plunger 29 away from the alining plate, and controls the operation of a locking arm 32 for the purpose of preventing the operation of the driving mechanism of the machine while the lever 1 is being shifted, at which time a nose 33 on an arm 32 is in a notch 34 of a disk 35 which is carried by the main drive shaft 25. The locking lever 32 is normally held out of engagement with the disk 35 by a spring 36 but when the thumb grip 31 is moved toward the lever 1 an arm 37 of the grip engages a member 38 which carries the plunger 29 and is itself carried by parallel arms pivoted on pins 39 and 40 to lever 1. The plunger 29 has a shoulder 41 which extends across the front edge of a plate 42 which is carried by a pair of arms 43 and 44 which are respectively pivoted on a shaft 45 and a pin 46. The arm 43 is fixed to the shaft 45 which carries the arm 32. Because of this arrangement when the plunger 29 is moved rearwardly the arm 43 rocks rearwardly and causes the arm 32 to move upwardly bringing the nose 33 of the arm into the notch 34 thus preventing rotation of the drive shaft 25 when the plunger 29 is out of engagement with the alining plate 30.

*Indicator screens.*—The indicator screens 50, 51, 52 and 53 are shown in Fig. 8 in their normal positions, in which positions they do not cover the indicator sight openings in the register cabinet. The screens are ordinarily left in this position at the completion of each operation of the machine. The screens 50 and 51 are carried by arms 54 loosely pivoted upon the indicator shaft 56. One of the arms 54 carries a segment gear 57 preferably made integral therewith, and having a pin 58 which co-acts with a hook shaped pawl 59 carried by a lever 60 for the purpose of connecting the segment gear 57 to the lever 60 which is also loosely pivoted upon the shaft 56 and connected by a pitman 61 to a cam 62 (Fig. 6) which is carried by main drive shaft 25. The cam 62 causes a reciprocation of the pitman 61 upon each operation of the machine. The pitman is first drawn downwardly causing the pawl 59 to be rocked upwardly to the position in which it is shown in Fig. 7. But before the drive shaft is rotated the lever 1 is first operated by pressing the thumb grip 31 toward the lever. This causes the arm 32 (Fig. 3) to be rocked upwardly as previously described. The arm 32 (Fig. 5) is provided with a pin 63 which extends through a slot 64 in a lever 65 which is pivoted to the frame of the machine on a pin 66 and at its upper end is provided with a lug 68 which extends at right angles to the lever across the tail 69 (Fig. 8) of the pawl 59. The pawl 59 is normally urged into engagement with the pin 58 by a spring 70, but when the grip 31 of the lever 1 is operated the arm 32 in rocking upwardly will cause the upper end of the lever 65 to rock forwardly so that the lug 68 of the lever engages the tail of the pawl 59 and rocks the pawl out of engagement with the pin 58. The spring 63 then quickly rocks the indicator screen carrying arms 54 and 55 into such position that the screens will cover the indicator sight openings of the cabinet. The pitman 61 is held in its lower position during the greater part of the rotation of the shaft 25 but as the shaft 25 nears its home position the pitman is again raised by the cam 62 causing pawl 59 to return to its original position as indicated in Fig. 8. When the pawl 59 reaches its upper position it ordinarily rocks forwardly as it passes the pin 58 thus connecting segment 57 with the lever 60. Therefore upon the return of the pawl 59 to its original position the segment 57 will also be returned to its initial position causing the indicator screens to rock away from the sight openings and therefore expose the setting of the indicators. The indicators are set while the roller 71 is in the circulator part 72 of the race of the cam 62 and it is at this time that the screens are held in their moved positions.

One of the objects of the present invention is to cause the screens 50 and 51 to be held in the position in which they cover the indication of a registration whenever a cost registration is made, and to this end means are provided for holding the pawl 59 out of engaging position with the pin 58 whenever the cost totalizer is in operative relation with the actuating mechanism. By rocking the pawl 59 rearwardly so that it will not engage the pin 58 upon the actuation of the pitman 61 the screens 50 and 51 will be left at the completion of the operation of the machine in the position to which they are drawn by the spring 63. For the purpose of rocking the pawl out of engaging position with the pin 58 the pawl is provided with a pin 73 for co-acting with an arm 74 which is carried by a short shaft 75. The shaft 75 carries an arm 76 (Fig. 4) which is a duplication of the arm 74 but co-acts with a pin 77 carried in any one of nine holes 78 in the pinion 5 of the indicator 6. It was previously stated that the indicator 6 serves the purpose of indicating which totalizer of the reel 10 is in operative relation with the actuating mechanism and as this depends upon the setting of the lever 1 it also indicates the position of the lever 1. There are nine totalizers mounted upon the reel 10 and the hole 78 which is opposite the surface 79 of the arm 76 corresponds with the totalizer which is in an operative position. The pin 77 is inserted in the particular hole 78 which corresponds to the totalizer it is desired to use for receiving cost registrations. When the cost totalizer is in operative relation with the actuating mechanism the pin 77 is in engagement with the arm 76 thus holding the arm 76 in the position in which it is shown by full lines in Fig. 4. The angular position of the arm 74 on the shaft 75 coincides with the position of the arm 76; therefore when the arm 76 is in the position in which it is shown in Fig. 4 the arm 74 will be in the position in which it is shown by full lines in Fig. 7. When in this position it is in the path of movement of the pin 73 of the pawl 59 and when the pawl is carried upward the pin 73 engages the surface 80 of the arm 74 causing the pawl to be cammed into the angular position shown by full lines in Fig. 7 with respect to its pivot by the time the pawl reaches its upward position. This operation is illustrated by Fig. 7 and with the pawl in the position in which it is shown by full lines the position of the flashes 50 and 51 will not be disturbed when the pawl is returned to its original position upon the return of the pitman 61.

An indicator for classes of transactions is provided, and this is covered at proper times by the screens 52 and 53 before referred to. These screens may move with screens 51 and 52 and mechanism is therefore employed connecting the two sets of screens so as to move screens 52 and 53 with screens 50 and 51. To this end the segment gear 57 meshes with a gear 81 which is rigidly mounted upon a shaft 82 also carrying a gear 84 meshing with a segment gear 85 (Fig. 5) which is loosely journaled upon the shaft 56 and is provided with a rearwardly extending arm 86 to which is pivoted by a pin 87 a link 89 connecting the arm 86 with one of the carrying arms 90 of the screens 52 and 53. When the segment gear 57 moves up from the position in which it is shown in Fig. 8 to the position in which it is shown in Fig. 7 it rocks the screens 50 and 51 into position for covering the indicators and through the gears 81 and 84 causes a similar upward movement of the segment gear 85 which by pulling the link 89 downwardly brings the screens 52 and 53 to the position in which they are shown in Fig. 5 thereby covering class transaction indicator 91. The screens 52 and 53 also return to their normal positions with the screens 50 and 51. The rearwardly extending arm 86 of the segment gear 85 (Fig. 5) also carries an aining arm 92 provided with a lug 93 which when the screens 52 and 53 return to their normal position engages one of the edges of a squared disk 94 carried by a shaft 95 supporting the transaction indicator. The engagement between the flat surface of the lug 93 and one of the edges of the disk 94 causes the transaction indicator to be alined and locked in its set position.

*Transaction indicator setting mechanism*.— The manner in which the transaction indicator is set is as follows: This indicator is for the purpose of indicating the four principal classes of transactions; it is provided with two sets of indications—one for reading at the front of the machine and one for reading at the rear of the machine. These indications read "Paid out", "Charge", "Received on account" and "Cash". The indicator 6 is rigid with a disk 96 (Figs. 1 and 3) which is provided with a spiral race 97 in which extends a roller 98 on a segment gear 99 which meshes with a pinion 100 fast to the transaction indicator 91. If the hand lever 1 is moved upward the disk 96 will rotate in the direction indicated by the arrow 102 (Fig. 3) and if the lever 1 is in its lowest position the part 103 of the race 97 will be in engagement with the roller 98. For the purpose of illustration it will be assumed that the totalizer which is in operative relation with the actuating mechanism when the lever 1 is in its lowest position is the one upon which "paid out" transactions are recorded; therefore when the roller 98 is engaged at the part 103 of the cam race 97 the words "Paid out" will be indicated by the indicator 91. Assuming that the next higher position of the lever 1 is the "charge" position the first unit of movement of the lever 1 will cause the disk 96 to rotate enough to cause the segment gear to rock far enough to rotate the transaction indicator through one-fourth of a rotation. The indicator thereby brings the word "Charge" before the sight openings in the register. The third position of the indicator is the "received on account" position, therefore the third position of the lever is the "received on account" position for the lever. The fourth position of the indicator is the "cash" position; therefore the fourth position of the lever 1 is also a "cash" position for the lever. The 5th, 6th, 7th and 8th positions of the lever 1 may all be "cash" positions. The indicator 91 of course does not need corresponding positions for all these "cash" positions of the lever 1. For this reason from the 4th to the 7th unit of movement of the cam 96 the race of the cam is circular thus not altering the setting of the indicator 91 as the cam 96 passes through these units of movement. The final or 8th unit of movement of the cam 96 also does not affect the position of the segment gear 99. The 8th unit of movement of the cam 96 corresponds to the movement of the lever 1 from its 8th to its 9th settings. The highest position of the lever 1 may be its position when the cost totalizer is in operative relation with the actuating mechanism and as the screens remain over the indicators when a cost registration is made it is not necessary to provide means for indicating the word "Cost"; therefore the indicator is left at its "Cash" reading.

A main or grand totalizer is represented at 105, Fig. 9. This totalizer is actuated each time one of the "cash" totalizers or "received on account" totalizer of the reel is actuated and to a like extent. The totalizer 105 therefore receives all the amounts which are added to these two different kinds of totalizers of the reel. The totalizer 105 and the means for actuating the same are fully described in the before mentioned patents, but it may be mentioned that it receives rotation from the segment gears 14 which are controlled in their movement by the value keys. As this totalizer is actuated only when either a "cash" or "received on account" transaction is recorded it is necessary to provide means for preventing engagement of the totalizer 105 with its actuating mechanism whenever a "cost", "charge" or "paid out" registration is made. The pinions which comprise the totalizer 105 are loosely journaled upon a shaft 106 and at the side of each pinion of the totalizer is a similar pinion which is also loosely journaled upon the shaft 106 but meshes with one of the intermediate gears 13. In operation the segments 14 are first returned to their zero positions thereby returning the gears 13 and the pinions on the shaft 106 to their zero positions. The segments 14 then rise extents which are determined by the depressed keys causing the gears 13 and the pinions with which they mesh to rotate similar extents away from their zero positions. When the segment gears 14 are at rest in their zero positions broad pinions 107 are rocked into mesh with the pinions on the shaft 106 thus connecting the totalizer pinions in pairs with the pinions which mesh with the gears 13. By this means the totalizer is forwardly rotated as desired. The totalizer pinions 107 are carried by arms 108 which are fixed to a shaft 109 (Fig. 9). The shaft 109 carries a downwardly extending arm 110 which is normally drawn by a spring 111 into such position that the broad pinions 107 will be out of mesh with the pinions on the shaft 106. The arm 110 carries a pin 112 upon which rests the hook like end 113 of a pitman 114, which is reciprocated at the proper time for meshing and unmeshing the broad pinions 107 by a cam 115 carried by the main drive shaft 25.

In order to disconnect the main totalizer from the differential mechanism it is merely necessary to disconnect the pitman 114 from the arm 110 thus permitting the spring 111 to hold the broad pinions 107 out of mesh during the entire operation of the machine. The lifting of the pitman 114 out of engagement with the pin 112 is determined by the setting of the reel lever 1. The setting of the lever 1 (Fig. 3) is communicated to a slide shaft 116 by the segment gear 7, the segment gear 8, the shaft 9, a bevel gear 117, (Fig. 11) on the shaft 9, a bevel gear 118, and a segment gear 119 which is rigid with the bevel gear 118. The segment gear 119 meshes with a rack 120 which is carried by shaft 116. Because of the connections between the lever 1 and the shaft 116 the shaft 116 will be moved in a longitudinal direction in exact correspondence with the angular movement of the lever 1 upon the setting of the lever. The shaft 116 may also be oscillated upon its axis and the teeth of the rack 120 are curved so as not to prevent the oscillation of the shaft and also for the purpose of not becoming unmeshed from the segment gear 119 upon such oscillation. The shaft 116 (Fig. 9) is oscillated to invariable extents upon operations of the machine by its connections—arm 121, link 122 and arm 123 with the shaft 124. The shaft 124 is also oscillated to invariable extents by a crank and pitman connection with the drive shaft 25, as described in the before mentioned patents. An arm 125 is rigidly carried by the shaft 116 and therefore moves with the shaft when the shaft is moved in a longitudinal direction and is also oscillated when the shaft is oscillated. The longitudinal movement of the shaft 116 may or may not bring the arm 125 below one of a series of pins 126, depending upon the positioning of the lever 1. An arm 127 (Figs. 9 and 11) which carries the pins 126 is provided with a plurality of seats 128 for these pins and the location of these seating holes with respect to the sidewise movement of the arm 125 corresponds to the settings of the lever 1. For instance, when the lever 1 is set in its lowest position the arm 125 will be brought opposite the hole at the right of the plate 127. If there is a pin in this particular hole then when the shaft 116 is rocked on its axis the arm 125 will engage the pin and thereby rock an arm 129 which carries the plate 127 causing a link 130 to be pushed upwardly. The link 130 (Fig. 9) is pivoted to the arm 129 at 131 and to pitman 114 at 132. The upward movement of the link 130 causes the pitman to be rocked upwardly away from the pin 112 and this movement of the link occurs before the part 133 of the race of the cam 115 engages the roller 134 of the pitman. Therefore when the pitman is projected outwardly it will not cause the broad pinions 107 to be rocked into mesh with the pinions on shaft 106, and thus the rotation of the intermediate gears 13 (Fig. 6) will not be communicated to the main totalizer 105.

It is usually desired to have the main totalizer accumulate amounts which are received, and it is therefore necessary to have the main totalizer out of operative relation with the differential mechanism when "paid out", "charge" or "cost" registrations are made. For this reason pins are placed in such of the holes 128 as corresponds to the "paid out", "charge" and "cost" totalizers of the reel. The arrangement of the throw-out mechanism for the main totalizer permits the selection of different positions of lever 1 for representing different classes of transactions. However, it is desirable that the "cost" and "cash" totalizers be grouped in such positions that the circular part of the race 97 (Fig. 3) in the cam 96 will be in engagement with the roller 98 when the lever 1 is in the correct position for these totalizers because the special indicator 91 will remain in the "Cash" reading when the roller 98 is in the circular part of the race.

*A modification.*—In the foregoing description the reel totalizers are mentioned as employed for recording different classes of transactions but it may be desirable to use the reel totalizers as clerks' totalizers. If such is the case a bank of transaction keys as illustrated in Fig. 10 is provided. The keys 135, 136, 137, 138 and 139 respectively represent the "paid out", "charge", "cost", "received on account" and "cash" keys. The "paid out", "charge" and "cost" keys control means for preventing the operation of the main totalizer when one of these keys is depressed upon a registration. Each of these keys carries a pin 140 which when a key is depressed engages a lever 141 rocking the same rearwardly. The lever 141 is connected by a link 142 to an arm 143 on a shaft 144. This shaft carries an arm 145 (Figs. 9 and 11) which when the shaft is rocked upon the depression of one of these three keys, engages the arm 129 rocking the arm upwardly and thereby permitting the broad pinions 107 to remain out of mesh upon the operation of the machine. In this modification special totalizers are not provided, special transactions being recorded by the printing mechanism alone. The same construction of the indicator screens is however provided. But in place of having pin 77 (Fig. 4) in the gear 5 the pin is placed in a gear 146 (Fig. 8), which gear is provided with holes 147 for receiving the pin and meshes with an intermediate gear 148 which is controlled by the bank of special keys. The rocking of the lever 74 will then depend upon the position of the pin and the extent of the rotation of gear 146 as controlled by the bank of special keys. As previously described, when the arm 74 is rocked outwardly it causes the pawl 59 to be rocked away from co-acting relation with the pin 58 and for this reason upon the operation of the machine the screens will be left in their covering position.

*Clerks' initial bank.*—The clerks' initial bank (Fig. 1) is indicated at 149. A segment gear 150 controlled by this bank meshes with the intermediate gear 148 which in turn meshes with the gear 146 rigid with an indicator drum 151. This drum is provided with two sets of indicia, the single indicator serving to indicate both at the front and rear of the machine.

The special indicators 6 and 91 (Fig. 1) duplicate the indications of "charge", "paid out" and "received on account" but when the indicator 91 indicates "cash" the indicator 6 may indicate the class of article sold as the machine is provided with five "cash" totalizers and the indicator drum 6 rotates when the lever 1 is moved to cause the reel to rotate from the position in which one of these totalizers is in operative relation with the actuating mechanism to the position in which another of these totalizers is in operative relation with the actuating mechanism while the indicator 91 remains at the "cash" position.

*Operation.*—In recounting the operation of the device a cost and a selling price entry will be described in order. To enter a cost price the lever 1 (Fig. 3) is adjusted to the predetermined cost position. To adjust the lever 1, thumb grip 31 is pressed toward lever 1, by its lug 37 forcing bolt 29 out of one of notches in plate 30 and the lever 1 is rocked to the desired position. Rearward movement of bolt 29 through its shoulder 41 forces plate 42 rearward, thus rocking locking arm 32 temporarily into locking position with disk 35 on the main drive shaft 25. This movement of locking arm 32 rocks lever 65 (Fig. 4) around its pivot 66 engaging lug 68 with the tail of pawl 59 thus releasing both pairs of indicator screens and permitting springs 63 (Fig. 8) to rock the screens to concealing position. Pawl 59 being normally in the position in which it is shown in Fig. 8 and spring pressed into engagement with pin 58, its operation when engaged by lug 68 is simply to rock out of engagement permitting screens 50 and 51 to move to concealing position. Segment gear 57 on the screen carrying arm, by rotating shaft 82, communicates the motion to screens 52 and 53 (Fig. 5), which then cover the transaction indicator 91. The adjustment of lever 1, by its toothed segment 7, segment gear 8, shaft 9 and segment gear thereon (not shown) rotates reel 10 (Fig. 2) the required distance to position the desired totalizer below actuating segments (not shown) on sleeves 12. Also adjustment of the lever 1 shifts shaft 116 (Fig. 11) in the direction of its length so that arm 125 carried thereby will be positioned below one of pins 126 thereby making the main totalizer throwout mechanism effective. When the lever 1 is properly adjusted and thumb grip 31 released, arm 32 returns to normal unlocking position. The amount keys representing the cost price and a clerks' initial key are depressed and then drive shaft 25 is given one rotation, either by a manually operated crank or a motor, to complete the operation of the machine. Rotation of shaft 25 effects actuation of the cost totalizer by first returning all of differential segments 14, if left out of zero position on the preceding operation. Then cam 28 (Fig. 2) lifts the totalizer reel meshing the selected totalizer, and following this movement differential segments 14, as controlled by the value keys, are rocked upwardly, thereby advancing the cost totalizer the required amount. Cam 28 finally lowers the reel to normal position. Before the registering movement of segments 14, the main totalizer 105 is disconnected from intermediate gears 13 by arm 125 (Fig. 9) engaging pin 126 in plate 127, thereby through link 130 lifting pitman 114 out of engagement with pin 112 on the frame carrying broad pinions 107, and thus allowing spring 111 to unmesh pinions 107 with the totalizer pinions and intermediate pinions of the same size which receive movement from intermediate gears 13 (Fig. 6). The main totalizer thereby remains unaffected during the cost entry. The value indicators are set through their geared connection with differential segments 13 but are not exposed to view as screens 50 and 51 remain in concealing position. The screen returning mechanism consisting of pawl 59, arm 60, pitman 61, and cam 62 (Figs. 8 and 6), is made inoperative by the adjustment of lever 1 to the cost position, as at such time a pin 77 (Fig. 4) in gear 5 engages arm 76 rocking arm 74 to the position shown in Fig. 7. Arm 74 is then in the path of movement of pin 73 on pawl 59 and holds the pawl in an ineffective position when reciprocated. When a selling price is entered in the machine the lever 1 is adjusted to a position representing the class of transaction thus positioning pin 77 (Fig. 4) away from lever 76 and permitting the screen restoring mechanism to operate in its normal manner so that when pawl 59 (Figs. 7 and 8) is reciprocated it will engage pin 58, and return the screens to normal position, permitting the amount set in the indicators to be viewed. The adjustment of lever 1 may shift shaft 116 (Fig. 11) so that arm 125 is positioned below a pin in plate 127 or not depending on the class of transaction position of the lever. Accordingly the main totalizer throwout mechanism is effective or not as required by the class of transaction. As lever 1 is geared to disk 96 (Fig. 3) right with transaction indicator 6 and having a spiral groove for actuating segment 99, both transaction indicators 6 and 91 will be properly set. The screens 52 and 53 are operated through their connections with the screens 50 and 51 as shown in Figs. 5 and 8. The selected reel totalizer and the main totalizer are actuated through their gear connections with differential segments 14.

If desired the amounts of "cost" registrations may be indicated to the operator while remaining hidden from the customer by removing the forward screen 51 and leaving the screen 50 in place providing the machine is suitably situated for this purpose.

From the foregoing description it will be seen that the novel mechanism well adapts the machine to register "cost" and "selling" transactions, and that the construction is such that any desired totalizer may be used for "cost" registrations. Though the indicator shown is of the well known differentially movable rotary type, it will be understood that any indicating mechanism capable of separately exhibiting a plurality of different indicia may be employed, and that various types of devices beside the pins 77 may be used, the only requirement being that such devices be controlled by the indicating mechanism and be adjustable relative thereto.

By the provision of the two indicators 6 and 91 and a driving connection between them, an indication may be given of the particular totalizer employed together with a full word indication of the class to which the transaction belongs. There, again, various types of indicating mechanism and connections may be employed, it being only necessary that the connections should cause movement of the indicating mechanism when some indications of the other indicating mechanism are brought to exhibiting position but prevent movement when others are brought to exhibiting position. The form shown, which provides a variable velocity ratio between the two mechanisms, is considered preferable.

While the form of mechanism herein shown and described is admirably adapted to fulfil the objects primarily stated, it is to be understood that it is not intended to confine the invention to the one form of embodiment herein shown and described as it is susceptible of embodiment in various forms all coming within the scope of the claims which follow.

What is claimed is:

1. In a machine of the class described, the combination with a differentially movable indicator bearing a plurality of characters, of means for bringing any one of the characters on said indicator into position to be exhibited, a concealing means for said indicator, an operating mechanism for said concealing means, and means controlled by the indicator for preventing the operation of the concealing means when certain characters are brought into position to be exhibited, the said means being manually adjustable so as to prevent the exhibition of any desired character.

2. In a machine of the class described, the combination with a differentially movable indicator bearing a plurality of characters, means for bringing any one of the characters into position to be exhibited, a concealing means for said indicator normally out of operative position, mechanism operated by the means for operating the indicator, for controlling the movement of the concealing means to operative position, means for withdrawing said concealing means to an inoperative position and means controlled by the indicator for preventing the operation of the withdrawing means when certain characters are brought into position to be exhibited, the said means being manually adjustable so as to prevent the exhibition of any desired character.

3. In a machine of the class described, the combination with a differentially movable indicator bearing a plurality of characters any one of which may be brought into position to be exhibited, of concealing means for said indicator, means for withdrawing the latter from concealing position, and means comprising adjustable pins for controlling the operation of the withdrawing means.

4. In a machine of the class described, the combination with a differentially movable indicator bearing a plurality of characters any one of which may be brought into position to be exhibited, of concealing means for said indicator, means including a pivoted latch for withdrawing the latter means from concealing position, an arm for holding the latch in inoperative position when it is desired to retain the concealing means in operative position, and means comprising adjustable pins for controlling said arm.

5. In a machine of the class described, the combination with a differentially movable indicator bearing a plurality of characters any one of which may be brought into position to be exhibited, of concealing means for said indicator, means for withdrawing the latter means from concealing position, means for rendering the withdrawing means inoperative, and an alining device for the indicator which is brought into operation only when the concealing means is withdrawn.

6. In a machine of the class described, the combination with a rotary indicator, and means for differentially positioning it, of a screen for concealing said indicator, devices, including a latch, for withdrawing said screen from concealing position, an arm for preventing or permitting movement of said latch, and devices, comprising adjustable pins movable with said indicator, positioned to engage and operate said arm.

7. In a machine of the class described, the combination with a rotary indicator and means for differentially positioning it, of a screen for concealing said indicator, devices, including a connecting latch, for withdrawing said screen from concealing position, and devices, comprising adjustable pins movable with said indicator, positioned to permit or prevent movement of said latch.

8. In a machine of the class described, the combination with an indicating mechanism comprising devices for separately exhibiting a plurality of indicia in the same area, of a screen for concealing the indication which is in exhibiting position, devices, including a displaceable element, for withdrawing said screen from concealing position, and means, controlled by said indicating mechanism and adjustable relative thereto, for actuating said displaceable element.

9. In a machine of the class described, the combination with an indicating mechanism comprising devices for separately exhibiting a plurality of indicia in the same area, of a screen for concealing the indication which is in exhibiting position, devices, including a connecting latch, for withdrawing said screen from concealing position, and means, comprising adjustable pins carried by said indicating mechanism, for displacing said connecting latch.

10. In a machine of the class described, the combination with an indicating mechanism comprising means for separately exhibiting a plurality of indicia, of a screen for concealing the indication which is in exhibiting position, devices, including a displaceable connecting element, for withdrawing said screen from concealing position, and means, controlled by said indicating mechanism and adjustable relative thereto, for actuating said displaceable element.

In testimony whereof I affix my signature in the presence of two witnesses.

EDWARD J. VON PEIN.

Witnesses:
CARL W. BEUST,
R. RUMMLER.

Copies of this patent may be obtained for five cents each, by addressing the "Commissioner of Patents, Washington, D. C."